(12) United States Patent
Shankar (10) Patent No.: US 11,410,292 B2
(45) Date of Patent: Aug. 9, 2022

(54) EQUI-PROBABILITY DEFECT DETECTION

(71) Applicant: KLA CORPORATION, Milpitas, CA (US)

(72) Inventor: Premchandra M. Shankar, Fremont, CA (US)

(73) Assignee: KLA CORPORATION, Milpitas, CA (US)

(*) Notice: Subject to any disclaimer, the term of this patent is extended or adjusted under 35 U.S.C. 154(b) by 134 days.

(21) Appl. No.: 17/029,372

(22) Filed: Sep. 23, 2020

(65) Prior Publication Data

US 2021/0097672 A1    Apr. 1, 2021

Related U.S. Application Data

(60) Provisional application No. 62/906,999, filed on Sep. 27, 2019.

(51) Int. Cl.
| | | |
|---|---|---|
| *G06T 7/00* | (2017.01) | |
| *G01N 21/95* | (2006.01) | |
| *G06T 5/50* | (2006.01) | |
| *G06K 9/62* | (2022.01) | |

(52) U.S. Cl.
CPC ....... *G06T 7/0004* (2013.01); *G01N 21/9501* (2013.01); *G06K 9/6284* (2013.01); *G06T 5/50* (2013.01); *G06T 2207/30148* (2013.01)

(58) Field of Classification Search
CPC ........... G01N 21/8851; G01N 21/9501; G01N 21/9505; G01N 2021/887; G01N 2021/8877; G01N 21/8806; G01N 21/95; G01N 21/95607; G06K 9/6284; G06T 2207/30148; G06T 5/50; G06T 7/0004; G06T 2207/10016; G06T 2207/10052; G06T 2207/20212; G06T 2207/20216; G06T 2207/20221; G06T 2207/20224; G06T 7/0008; G06V 10/50; H01L 22/12; H01L 22/10; H01L 22/20; H01L 22/24

See application file for complete search history.

(56) References Cited

U.S. PATENT DOCUMENTS

| | | |
|---|---|---|
| 5,808,735 A | 9/1998 | Lee et al. |
| 6,870,950 B2 | 3/2005 | Houge et al. |
| 10,062,156 B2 | 8/2018 | Shankar et al. |
| 10,605,744 B2 | 3/2020 | Chen et al. |
| 2017/0178980 A1 | 6/2017 | Owen et al. |
| 2021/0018850 A1* | 1/2021 | Slachter ............ G03F 7/705 |

FOREIGN PATENT DOCUMENTS

| | | |
|---|---|---|
| KR | 20170082559 A | 7/2017 |
| KR | 101793565 B1 | 11/2017 |

OTHER PUBLICATIONS

WIPO, ISR for PCT/US2020/052596, Jan. 8, 2021.
Shankar, et al., "Sparsity constrained regularization for multiframe image restoration", Journal of the Optical Society of America A, May 2008, pp. 1199-1214, vol. 25, Issue 5, USA.

* cited by examiner

Primary Examiner — Michael J Vanchy, Jr.
(74) *Attorney, Agent, or Firm* — Hodgson Russ LLP (57) ABSTRACT

For semiconductor inspection images, detection thresholds can be determined based on probability density functions at a pixel intensity. The detection thresholds can then be applied to an image. This can find outliers at a fixed probability at all pixel intensity levels by estimating the probability distribution of underlying data and adapting the detection threshold values. Laser power can be optimized based on the detection thresholds.

20 Claims, 6 Drawing Sheets

FIG. 7

EQUI-PROBABILITY DEFECT DETECTION

CROSS-REFERENCE TO RELATED APPLICATIONS

This application claims priority to the provisional patent application filed Sep. 27, 2019 and assigned U.S. App. No. 62/906,999, the disclosure of which is hereby incorporated by reference.

FIELD OF THE DISCLOSURE

This disclosure relates to inspection of semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

During inspection, previous methods applied a fixed threshold at each pixel intensity to segment. This produced a fixed probability of outlier detection if underlying data is Gaussian distributed. Pre-processing approaches, such as intensity-based image segmentation, were used to overcome the issue that underlying distributions are not the same at all intensity levels. Different threshold values were then used for defect detection at different segments, which increased recipe set up time. Due to extended manual tuning of algorithm parameters, previous defect detection approaches are not suitable to be used in automated process of inspection-based laser power setup.

Figure 1:
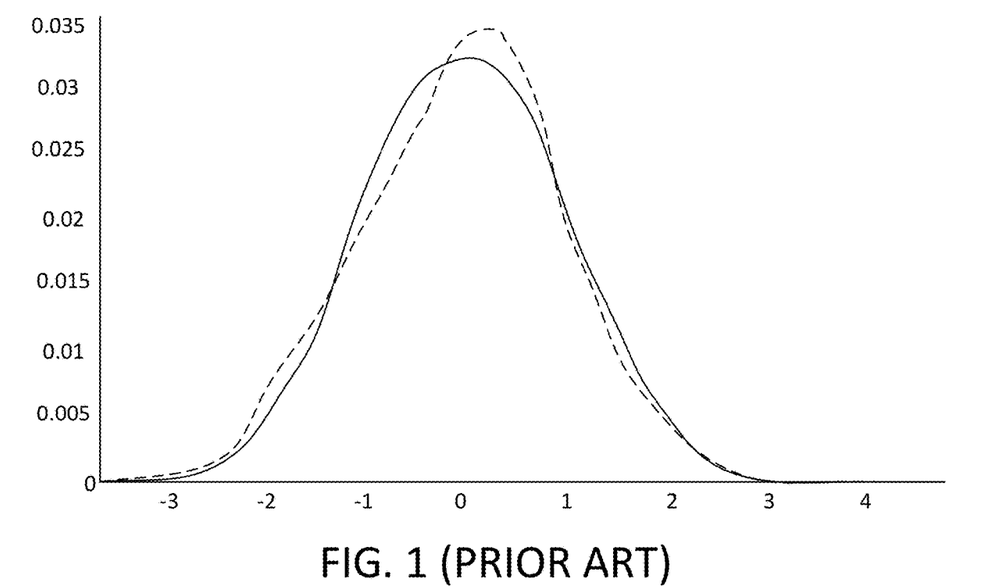
FIG. 1 is a chart showing a difference histogram at a pixel intensity of 1600.
Figure 2:
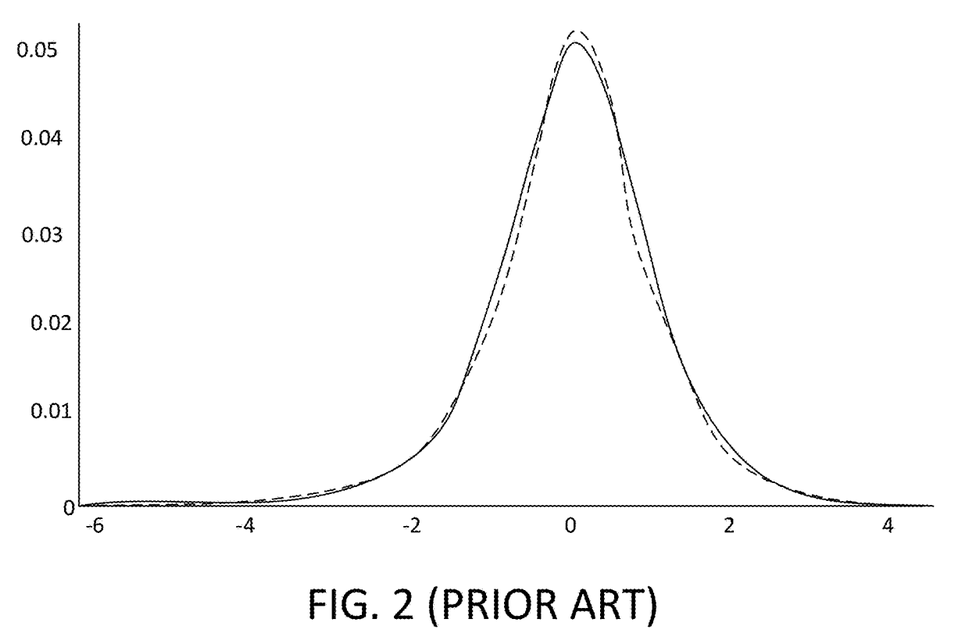
FIG. 2 is a chart showing a difference histogram at a pixel intensity of 2624.

FIG. 1 displays a histogram of difference images at pixel intensity of 1600 and FIG. 2 displays a histogram of difference images at pixel intensity of 2624. Pixel intensity can be a 12-bit grey level. For example, pixel intensity can have a range of 0-4095. The dashed line curve represents the actual data and the solid curve represents generalized Gaussian density fit to the data. The plot in FIG. 1 is near-normal (Gaussian) distributed and the plot in FIG. 2 is subnormal (close to Laplacian) distributed. If, as in a previous defect detection approach, a fixed threshold based on standard deviation is used to detect outliers at these pixel intensities, more defects will be detected at a higher probability rate at intensity of 2624 than 1600. To overcome this drawback, intensity-based segmentation was set up and a higher threshold value is used in the 2624-segment than in the 1600-segment. However, this required additional user recipe setup time, which is not desired for the automated process of finding optimal laser power.

Therefore, improved systems and methods of inspection are needed.

BRIEF SUMMARY OF THE DISCLOSURE

In a first embodiment, a system is provided. The system comprises a light source that generates a beam of light (e.g., a laser), a stage configured to hold a wafer, a detector that receives the beam of light reflected from the wafer, and a processor in electronic communication with the detector. The processor is configured to determine detection thresholds based on probability density functions at a pixel intensity of a die or a median pixel intensity of a plurality of dies. The processor is also configured to apply the detection thresholds to at least one image. The image is generated using data from the detector.

The detection thresholds can be further based on estimated shape parameters and/or probability of outlier detection.

The processor can be further configured to determine a distribution of difference images generated using the data from the detector. In an instance, the processor is configured to adapt the detection thresholds based on the distribution.

A method is provided in a second embodiment, The method comprises imaging a wafer using an optical inspection system thereby forming at least one image; determining, using a processor, detection thresholds based on probability density functions at a pixel intensity of a die or a median pixel intensity of a plurality of dies; and applying the detection thresholds to at least one image using the processor.

The images can be generated during a hot scan.

Each of the images can be of a die on the wafer.

The optical inspection system can use a laser.

The determining can be further based on estimated shape parameters and/or probability of outlier detection.

There can be a plurality of the images, and the method can further include determining a distribution of difference images from the plurality of the images. In an instance, the detection thresholds are adapted based on the distribution.

The method can further include performing defect detection after the detection thresholds are applied.

The method can further include optimizing laser power based on the detection thresholds.

A non-transitory computer-readable storage medium is provided in a third embodiment. The non-transitory computer-readable storage medium comprises one or more programs for executing the following steps on one or more computing devices. The steps include receiving at least one image of a semiconductor wafer; determining detection thresholds based on probability density functions at a pixel intensity of a die or a median pixel intensity of a plurality of dies; and applying the detection thresholds to at least one image.

The determining can be further based on estimated shape parameters and/or probability of outlier detection.

There can be a plurality of the images. The steps can further include determining a distribution of difference images from the plurality of the images and adapting the detection thresholds based on the distribution.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein provide a statistical algorithm for defect detection during semiconductor wafer inspection. The disclosed algorithm can be used in an automated process for finding optimal and/or safe laser power on a wafer inspection tool. One objective is to detect anomalies/defects on variety of wafers without significant recipe set up by the user. This is achieved by finding outliers at a fixed probability at all pixel intensity levels by estimating the probability distribution of underlying data and adapting the detection threshold values. These detection threshold values are related to the number and type of defects that may be identified during inspection.

The distribution of difference images (background) can be estimated and the detection thresholds can be adapted based on the estimated distribution. This allows improved adaptation to different data needed in automated inspection strategies with less user intervention. Thus, embodiments disclosed herein can be used for "smart" hot scans during defect discovery process and may reduce the time needed for setting up intensity-based segmentation of images.

Embodiments disclosed herein can be used during inspection-based optimization of laser power level. A defect detection algorithm using thresholds can 1) use minimal or no recipe tuning, 2) report any excursion due to wafer damage, and/or 3) be usable for wafers from different layers and manufacturers. One objective is to detect relatively strong defects, but not with high sensitivity, at all light levels, and for different layers and/or manufacturers.

Figure 3:
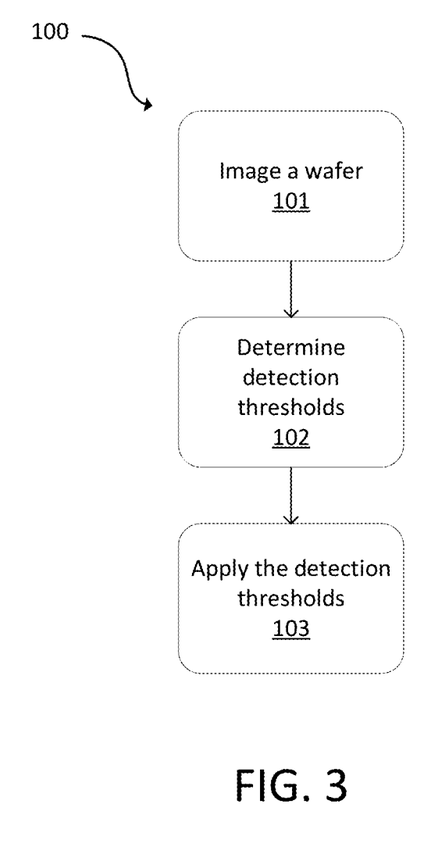
FIG. 3 is a flowchart of a method in accordance with the present disclosure.

FIG. 3 is a flowchart of a method 100. A wafer is imaged using an optical inspection system at 101, which forms at least one image. The images can be generated during a hot scan and may be of individual dies on the wafer. In an instance, the optical inspection system uses a laser to generate a beam of light directed at the wafer.

Using a processor, detection thresholds are determined at 102 based on probability density function at a pixel intensity of a die or median pixel intensity of multiple dies. A nominal detection threshold that defines the probability of detection can be set in the inspection recipe. Actual detection thresholds applied at a pixel intensity can be adjusted based on probability density function at a pixel intensity. A probability density function is a function whose value at a sample (or point) in the sample space (the set of possible values taken by the random variable) can be interpreted as providing a likelihood that the value of the random variable equals that sample. While the absolute likelihood for a continuous random variable to take on any particular value is 0 because there are an infinite set of possible values, the value of the probability density function at two different samples can be used to infer, in any particular draw of the random variable, how much more likely it is that the random variable would equal one sample compared to the other sample. The probability density function can be used to specify the probability of the random variable falling within a particular range of values instead of taking on any one value. This probability is given by the integral of this variable's probability density function over that range. Thus, this probability is given by the area under the density function but above the horizontal axis and between the lowest and greatest values of the range. The probability density function is nonnegative everywhere, and its integral over the entire space is equal to 1.

This determination of detection thresholds can be further based on estimated shape parameters of the pixel probability density function and/or probability of outlier detection set in the inspection recipe. In an example, the probability density function is characterized by a shape parameter. The algorithm can estimate the shape parameter based on the data. Determination of shape parameter can be based on the data statistics of the image pixels. The probability of outlier detection can be set in the inspection recipe. An actual detection threshold applied at a pixel intensity can be determined by (1) a probability of outlier detection set in the recipe and (2) an estimated shape parameter of the density function.

The detection thresholds are applied to at least one image using the processor at 103. Defect detection can be performed after the detection thresholds are applied.

Laser power level can be optimized based on the method 100. Optimal laser power determination may be a system level task. A small sample of dies on wafers can be scanned at different laser powers and compared to a baseline scan result. A highest power level above which scan results show variation from the baseline result can be considered as the optimal power level. These scans at different power levels can be facilitated without any inspection recipe setup.

In an instance, there are a plurality of the images. In another instance, a single die inspection approach is used. A distribution of difference images can be determined from the plurality of the images and the detection thresholds can be adapted based on the distribution. Embodiments disclosed herein can be used for modeling statistics of different intensity distributions from images from multiple dies or difference in multiple patches from one die image. While a difference image is disclosed to estimate underlying densities, averages of difference images or products of difference images also can be used.

For a distribution of difference images, the histogram of difference image pixels falling at a given median intensity can be formed first. Based on this histogram, probability distribution function can be estimated.

The method 100 assumes that underlying data belongs to a family of probability distributions, namely generalized Gaussian densities. The density function is parameterized by a shape parameter that can represent different density functions. For example, shape=2 represents Gaussian distribution and shape=1 represents Laplacian distribution. The die image depicted in FIG. 4, which has large intensity range of 1500 to 3000 within one inspection region. This die image in FIG. 4 can be used to illustrate method 100.

Figure 4:
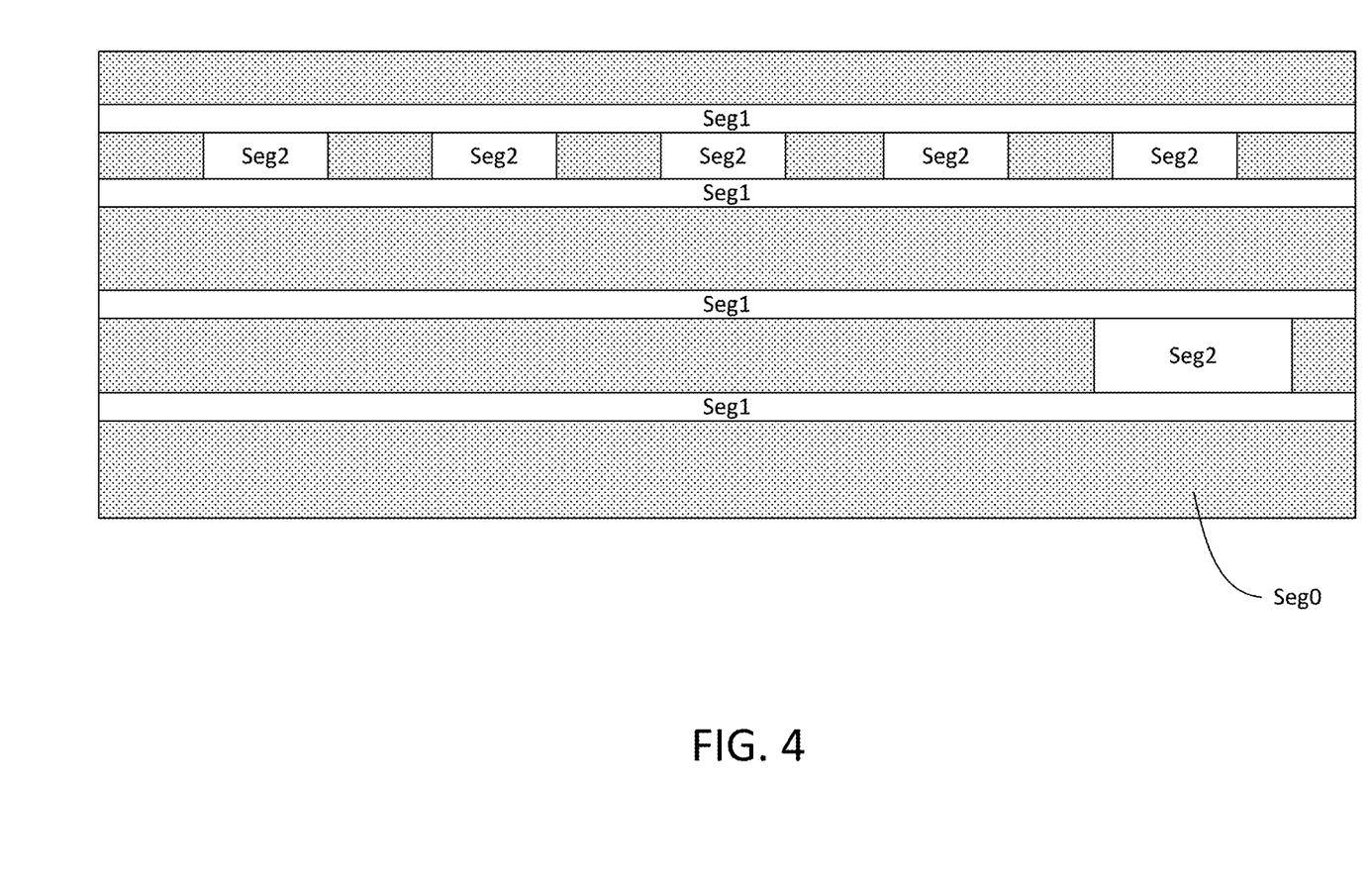
FIG. 4 is a diagram showing segments in an image.

A user (e.g., an application engineer) may set up three different intensity-based segmentations as listed in Table 1, which shows the typical segment-based inspection parameters in FIG. 4. In FIG. 4, segment 0 (shown with hatching) tends to be less noisy than segment 1 and segment 2 tends to be noisier than segment 1.

Typically, higher detection thresholds are set at higher intensity levels to keep defect counts at reasonable numbers. If the underlying distribution of difference images is indeed Gaussian at all pixel intensity levels, a fixed detection threshold should detect outliers at fixed probability of detection.

TABLE 1

| Segment ID | Intensity Range | Detection Threshold for Existing Method |
|---|---|---|
| 0 | I < 2020 | 14 |
| 1 | 2020 <= I < 2750 | 15.5 |
| 2 | I >= 2750 | 17 |

In Table 1, I represents a median of intensity for three dies at a given pixel location.

Difference image distributions may vary at different pixel intensity values. The histogram of difference image pixels falling at a given median intensity can be formed first. Based on this histogram, probability distribution function can be estimated.

Figure 5:
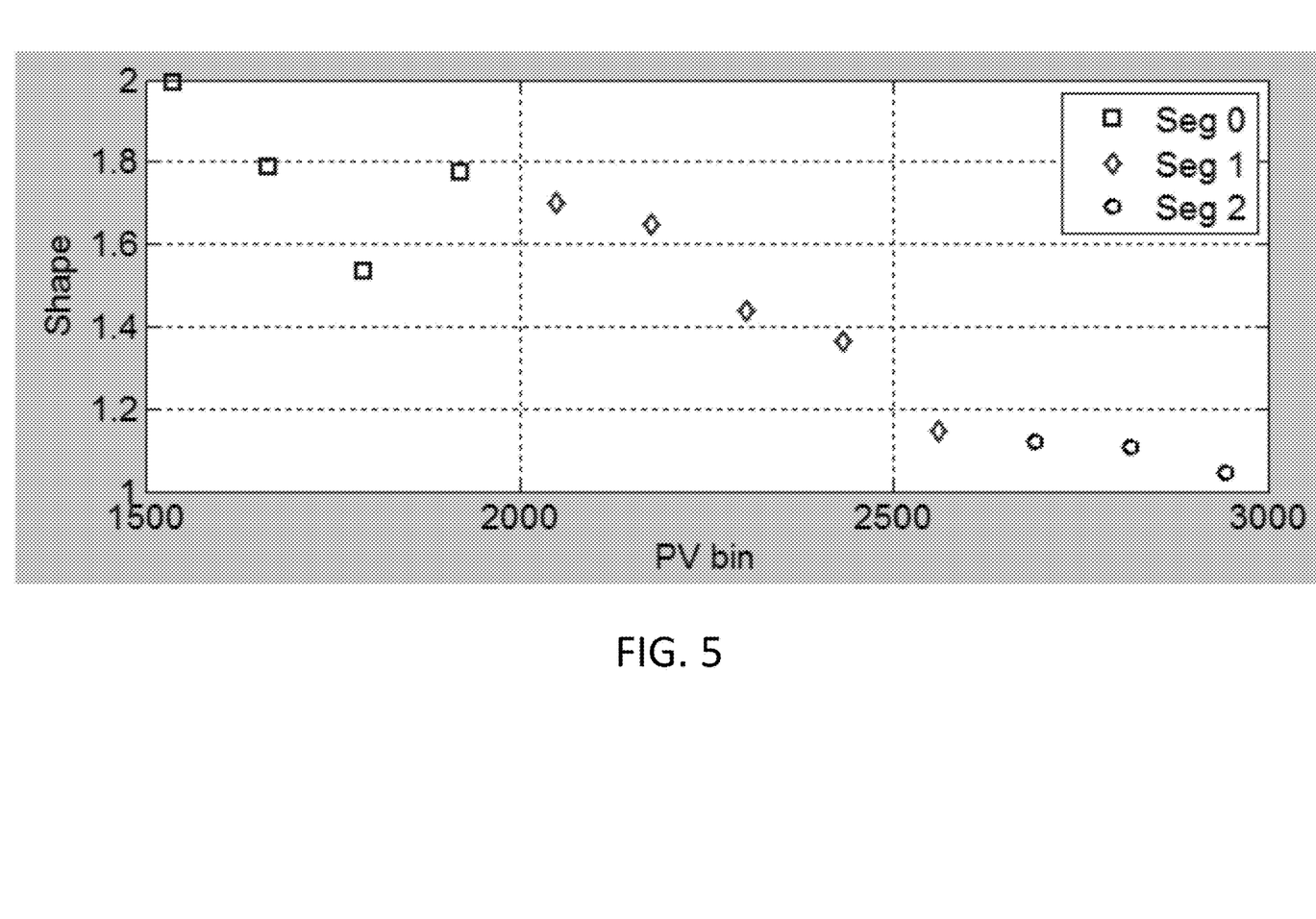
FIG. 5 is a chart showing density shape parameters measured from the data.
Figure 6:
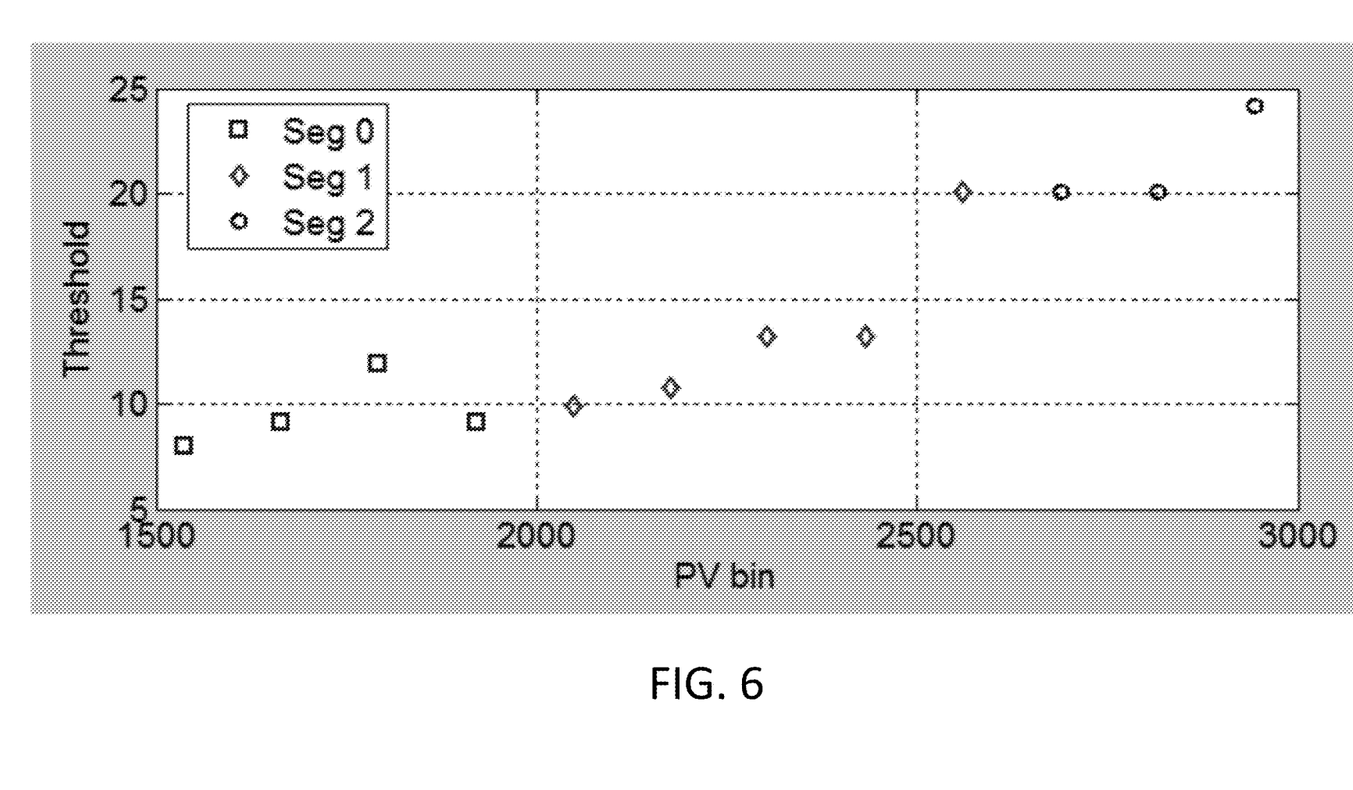
FIG. 6 is a chart showing corresponding threshold values for detection at probability of approximately $10^{-15}$.

In an instance, the thresholds are based on density shape parameters. The distribution of different intensities can be modelled using, for example, Generalized Gaussian Density. These density functions can be characterized by three parameters, one of which is shape. Measured shape parameters of the distribution at several pixel intensity values in each segment are displayed in FIG. 5. The shape on the vertical axis in FIG. 5 is an example of a shape parameter, which can affect distribution. Corresponding detection threshold values for the fixed probability of outlier detection of approximately $10^{-15}$ are plotted in FIG. 6.

In this example, the distribution is near normal at low intensities in segment 0, subnormal in medium intensity range in segment 1 and highly sub-normal (i.e., around Laplacian) at high intensity range in segment 2 as summarized in the estimated density function at different pixel intensities in Table 2.

TABLE 2

| Segment ID | Density Shape Parameter | Density Descriptor | Detection Thresholds |
|---|---|---|---|
| 0 | 1.6-2.0 | Near-Normal | 8-12 |
| 1 | 1.2-1.7 | Sub-Normal | 10-20 |
| 2 | <1.2 | Highly sub-Normal | 20-25 |

Detection thresholds can be assigned based on the estimated probability density functions at a given pixel intensity. A probability of outlier detection can be set in the inspection recipe parameters. This probability value can translate to different detection thresholds values for different generalized Gaussian densities. At a given pixel, the actual detection threshold can be determined by Generalized Gaussian density (given by shape) and probability of outlier detection.

Detection thresholds are derived by using the estimated shape parameters and probability of outlier detection set in the algorithm recipe. In the above example, for probability of $10^{-15}$, detection threshold values are in ranges of (8-12), (10-20), and (20-25) in segment 0, 1, and 2, respectively. The meanings of these thresholds are different than the thresholds listed in Table 1. Detection thresholds increase with pixel intensity as in the user set up recipe in Table 1.

Distribution can be estimated at each pixel in an embodiment. Outliers can be captured.

Defect detection can adapt detection thresholds based on underlying data distribution. The detection thresholds can be set manually or automatically.

For safe power optimization tasks, a fixed probability of outlier can be determined based on characterization on different wafers, which leads to recipe-less inspection (zero-knob algorithm). A single knob that specifies probability of detection also can be provided for tuning purposes (single-knob algorithm). By tuning, a user can change the default outlier detection probability value set in the recipe parameters if needed.

Laser scanning wafer inspection tools can have multiple inspection channels, which enables channel image fusion approaches toward defect detection. Embodiments disclosed herein can be applied to image fusion approaches. Zero-knob and single-knob channel image fusion algorithms can also be implemented as part of the safe power automation feature. Thus, embodiments disclosed herein can be used with one channel or multiple channels. Laser Scanning (LS) wafer inspection tools can have more than one imaging channel, which produce multiple copies of images at any given wafer location.

As shown in this example, 1) large defects (>=100 nm) can be detected with high capture rate, 2) the approach can detect any excursion in defect counts due to high laser power on wafer, and 3) one preset recipe threshold value (fixed probability of outlier detection) can be used over different wafers, including direct step on wafer (DSW) and other types of wafers.

The segments on the diagram of FIG. 4 can be adjusted after the determination using the embodiments disclosed herein. Thus, the segments may move or be redistributed on the die after the method 100 is completed.

The method 100 can be used in an optical inspection system that uses a laser. The optimal light level or laser power for inspection can be determined. This determination can be automated. For example, this can be used to automate finding optimal laser power in wafer inspection, smart hot scans, recipe-less inspections at low-end dark field tools, or other applications. This can reduce the algorithm recipe setup time.

Figure 7:
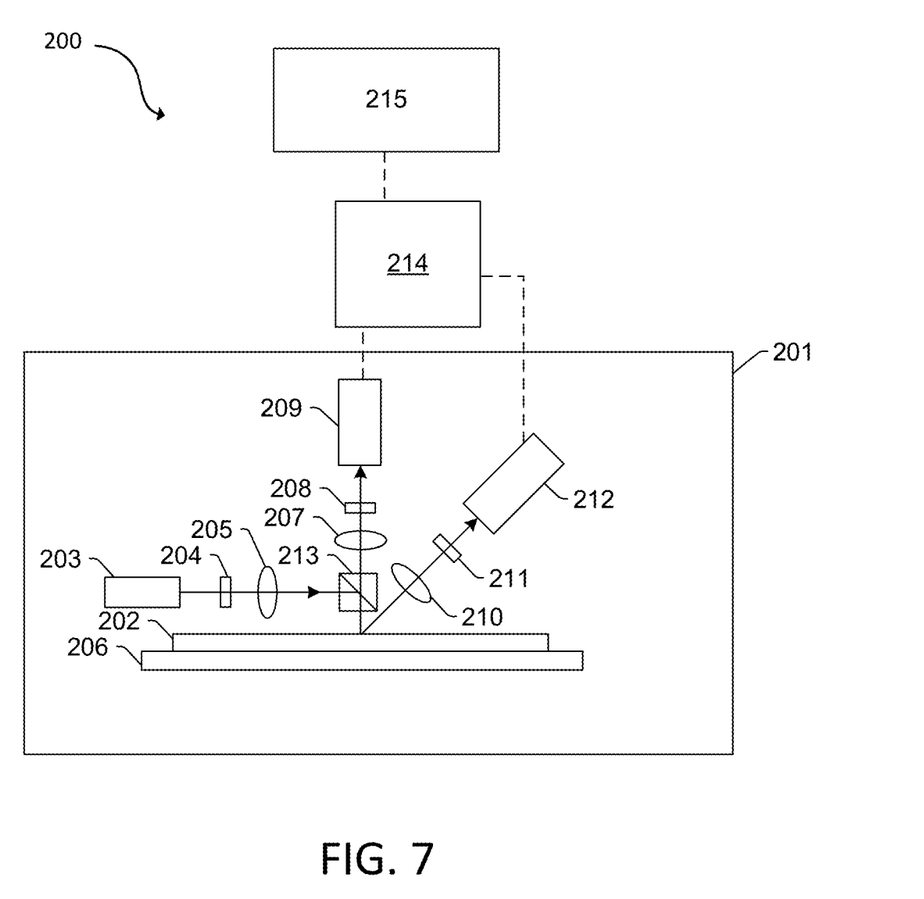
FIG. 7 is a diagram of a system in accordance with the present disclosure.

One embodiment of a system 200 is shown in FIG. 7. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 7, optical based subsystem 201 includes an illumination subsystem configured to direct light to specimen 202. The illumination subsystem includes at least one light source. For example, as shown in FIG. 7, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 7, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 7. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 7 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 7) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 7 as a single refractive optical element, it is to be understood that, in practice, lens 205 may include a number of refractive and/or reflective optical elements that in combination focus the light from the optical element to the specimen. The illumination subsystem shown in FIG. 7 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 7 includes two detection channels, one formed by collector 207, element 208, and detector 209 and another formed by collector 210, element 211, and detector 212. As shown in FIG. 7, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 7, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 7 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 7 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 7 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 7 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with an SEM.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to determine detection thresholds based on probability density functions at a pixel intensity of a die or a median pixel intensity of a plurality of dies and then apply the detection thresholds to at least one image. The image is generated using data from the detector. The detection thresholds also can be based on estimated shape parameters and/or probability of outlier detection. The processor 214 can be further configured to determine a distribution of difference images generated using the data from the detector and adapt the detection thresholds based on the distribution. The laser power can be optimized based on the detection thresholds.

An additional embodiment relates to a non-transitory computer-readable medium storing program instructions executable on a controller for performing a computer-implemented method for wafer inspection, as disclosed herein. In particular, as shown in FIG. 7, electronic data storage unit 215 or other storage medium may contain non-transitory computer-readable medium that includes program instructions executable on the processor 214. The computer-implemented method may include any step(s) of any method(s) described herein, including method 100. The steps can include receiving at least one image of a semiconductor wafer; determining detection thresholds based on probability density functions at a pixel intensity of a die or a median pixel intensity of a plurality of dies; and applying the detection thresholds to at least one image. The detection thresholds also can be determined based on estimated shape parameters and/or probability of outlier detection. There may be a plurality of images, and the steps can further include determining a distribution of difference images from the plurality of the images and adapting the detection thresholds based on the distribution. The laser power can be optimized based on the detection thresholds.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

As used throughout the present disclosure, the term "wafer" generally refers to substrates formed of a semiconductor or non-semiconductor material. For example, a semiconductor or non-semiconductor material may include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed. One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

For the purposes of the present disclosure, the term "multi-channel" may refer to two or more inspection channels of a single inspection system or a first inspection channel of a first inspection system and an additional inspection channel of an additional inspection channel. In this regard, the term "multi-channel" should not be interpreted as a limitation to a single inspection system.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
    a light source that generates a beam of light;
    a stage configured to hold a wafer;
    a detector that receives the beam of light reflected from the wafer; and
    a processor in electronic communication with the detector, wherein the processor is configured to:
        determine detection thresholds based on probability density functions at a pixel intensity of a die or a median pixel intensity of a plurality of dies; and
        apply the detection thresholds to at least one image, wherein the image is generated using data from the detector.

2. The system of claim 1, wherein the light source is a laser.

3. The system of claim 1, wherein the detection thresholds are further based on estimated shape parameters.

4. The system of claim 1, wherein the detection thresholds are further based on probability of outlier detection.

5. The system of claim 1, wherein the processor is further configured to determine a distribution of difference images generated using the data from the detector.

6. The system of claim 5, wherein the processor is further configured to adapt the detection thresholds based on the distribution.

7. A method comprising:
    imaging a wafer using an optical inspection system thereby forming at least one image;
    determining, using a processor, detection thresholds based on probability density functions at a pixel intensity of a die or a median pixel intensity of a plurality of dies; and
    applying the detection thresholds to at least one image using the processor.

8. The method of claim 7, wherein the images are generated during a hot scan.

9. The method of claim 7, wherein each of the images is of a die on the wafer.

10. The method of claim 7, wherein the optical inspection system uses a laser.

11. The method of claim 7, wherein the determining is further based on estimated shape parameters.

12. The method of claim 7, wherein the determining is further based on probability of outlier detection.

13. The method of claim 7, wherein there are a plurality of the images, and further comprising determining a distribution of difference images from the plurality of the images.

14. The method of claim 13, further comprising adapting the detection thresholds based on the distribution.

15. The method of claim 7, further comprising performing defect detection after the detection thresholds are applied.

16. The method of claim 7, further comprising optimizing laser power based on the detection thresholds.

17. A non-transitory computer-readable storage medium, comprising one or more programs for executing the following steps on one or more computing devices:
    receiving at least one image of a semiconductor wafer;
    determining detection thresholds based on probability density functions at a pixel intensity of a die or a median pixel intensity of a plurality of dies; and
    applying the detection thresholds to at least one image.

18. The non-transitory computer-readable storage medium of claim 17, wherein the determining is further based on estimated shape parameters.

19. The non-transitory computer-readable storage medium of claim 17, wherein the determining is further based on probability of outlier detection.

20. The non-transitory computer-readable storage medium of claim 17, wherein there are a plurality of the images, wherein the steps further include determining a distribution of difference images from the plurality of the images and adapting the detection thresholds based on the distribution.

* * * * *